(12) United States Patent
Matsumoto

(10) Patent No.: US 6,460,263 B1
(45) Date of Patent: Oct. 8, 2002

(54) METHOD AND APPARATUS FOR MEASURING BENDING ANGLE AND SYSTEM FOR MEASURING BENDING ANGLE USING THE SAME APPARATUS

(75) Inventor: Masateru Matsumoto, Kanagawa (JP)

(73) Assignee: Amada Electronics Company, Limited, Kanagawa (JP)

( * ) Notice: Subject to any disclaimer, the term of this patent is extended or adjusted under 35 U.S.C. 154(b) by 0 days.

(21) Appl. No.: 09/600,876

(22) PCT Filed: Feb. 17, 1999

(86) PCT No.: PCT/JP99/00695

§ 371 (c)(1),
(2), (4) Date: Sep. 21, 2000

(87) PCT Pub. No.: WO99/42233

PCT Pub. Date: Aug. 26, 1999

(30) Foreign Application Priority Data

Feb. 20, 1998 (JP) ............................................ 10-039243

(51) Int. Cl.⁷ ............................................... G01B 21/32
(52) U.S. Cl. .............................. 33/534; 33/1 N; 33/549
(58) Field of Search ........................ 33/534, 1 N, 471, 33/538, 549

(56) References Cited

U.S. PATENT DOCUMENTS

| | | | |
|---|---|---|---|
| 655,005 A | * 7/1900 | Penfield | ........................ 33/471 |
| 784,652 A | * 3/1905 | Beardsley | .................... 33/471 |
| 5,099,666 A | 3/1992 | Sartorio et al. | |
| 5,329,597 A | 7/1994 | Kouno et al. | |
| 5,375,340 A | * 12/1994 | Gerritsen | ..................... 33/534 |
| 5,603,236 A | * 2/1997 | Hongo | ........................ 33/1 N |
| 5,799,530 A | 9/1998 | Nagasawa | |
| 5,857,366 A | 1/1999 | Koyama | |
| 5,980,085 A | 11/1999 | Uemura et al. | |
| 6,035,242 A | 3/2000 | Uemura et al. | |
| 6,240,646 B1 | * 6/2001 | Ronnmark et al. | ........... 33/534 |

FOREIGN PATENT DOCUMENTS

| | | |
|---|---|---|
| JP | 57162502 | 10/1982 |
| JP | 59160708 | 9/1984 |
| JP | 60247415 | 12/1985 |
| JP | 6-262265 | 9/1994 |

OTHER PUBLICATIONS

English Language Abstract of JP 57–162502, Oct. 13, 1982.
English Language Abstract of JP 59–160708, Sep. 11, 1984.
English Language Abstract of JP 60–247415, Dec. 7, 1985.
English Language Abstract of JP 6–262265, Sep. 20, 1994.

* cited by examiner

Primary Examiner—Christopher W. Fulton
(74) Attorney, Agent, or Firm—Greenblum & Bernstein, P.L.C.

(57) ABSTRACT

When a workpiece W whose bend angle is to be measured is slid and pressed on to a rotor (9) in a state where the workpiece has been caused to abut on a first supporting member (7) which is a reference face, the rotor (9) rotates about a rotation center shaft (31) provided on a second supporting member (29), so that the bend angle is measured by reading the rotation angle of the rotor 9 by a detector (39). At this time, the height position of the first supporting member (7) relative to the rotation center of the rotor (9) is adjusted so that the rotation center is positioned within a contacting range R of the workpiece W and the rotor (9). Incidentally, prior to bend angle measurement, the rotor (9) is rotated such that a projection (33) is caused to abut on a stopper (35) provided on the second supporting member (29), thereby performing a calibration. A bend angle measurement can be performed easily, quickly and accurately using a small-sized and light apparatus.

8 Claims, 9 Drawing Sheets

METHOD AND APPARATUS FOR MEASURING BENDING ANGLE AND SYSTEM FOR MEASURING BENDING ANGLE USING THE SAME APPARATUS

TECHNICAL FIELD

The present invention relates to a bend angle measuring method for measuring a bend angle of a product which has been subjected to bending work by a bending machine and an apparatus therefor, and an angle measuring system using the apparatus.

BACKGROUND ART

With reference to FIG. 13, it is conventionally common to use a protractor 101 when a bend angle of a workpiece W which has been subjected to bending work by a bending machine is measured. The protractor 101 is structured with a base 103 serving as a reference, a rotating member 107 rotatably provided to the base 103 by a pin 105 and an angle indicating plate 109 for indicating the angle of the rotating member 107 to the base 103.

In a angle measurement using the protractor 101, a side WA of the workpiece W serving as the reference at a time of measurement is caused to abut on the base 103 and another side WB of the workpiece W which has been bent is caused to abut on the rotating member 107 with its whole surface, so that an angle measurement is performed by reading the angle of the rotating member 107 from the angle indicating plate 109 at this time.

However, in an angle measurement using such a protractor 101, there is a problem that, when the workpiece W is brought into area contact with the base 103 and the rotating member 107, a worker grasps the workpiece W and the base 103 in his/her one hand, while swings the rotating member 107 in his/her other hand to bring the rotating member 107 into area contact with the workpiece W which has been bent without any clearance, and he/she must read the bend angle of the workpiece W, which is very troublesome and requires much time.

In this circumstance, as shown in Japanese Patent Application Laid-Open No. 6-262265 publication, the present applicant has proposed that one side of a bent workpiece W is sucked to a reference side of an angle measuring apparatus and another bent side of the workpiece W is also sucked to a measuring side of the angle measuring apparatus to be brought into close contact therewith so that measurement of an accurate bend angle is performed.

However, in the angle measuring apparatus shown in the above-mentioned Japanese Patent Application Laid-Open No. 6-262265 publication, an accurate angle measurement can be performed, but there is a problem that the angle measuring apparatus is complicated and is large-scaled.

Accordingly, the present invention has been made in view of the above conventional art, and an object thereof is to provide a bend angle measuring method which can perform bend angle measurement easily, quickly and accurately using a small-sized and light apparatus, and an apparatus therefor as well as an angle measuring system using this apparatus.

DISCLOSURE OF THE INVENTION

In order to achieve the above object, a bent angle measuring method of the invention according to a first aspect comprises the steps of: causing one side of a workpiece which has been bent by a bending machine to abut on a first supporting member serving as a reference surface; sliding the workpiece in a state where the one side of the workpiece has been caused to abut on the first supporting member; pressing another bent side of the workpiece on to a rotatable rotor to come in close contact with the rotor; adjusting a height position of the of the first supporting member relative to the rotation center of the rotor; setting the rotation center within a contact range of the rotor and the workpiece; and reading the rotation angle of the rotor to obtain a bend angle of the workpiece in a state of the above step.

In the above bend angle measuring method, when a workpiece whose bend angle is to be measured is slid to be pressed on to the rotor in a state where the workpiece is caused to abut on the first supporting member serving as the first reference surface, the rotor is rotated, so that the bend angle of the workpiece is measured from the rotation angle of the rotor. At this time, the height position of the first supporting member is adjusted relative to the rotation center of the rotor, so that the rotation center is positioned within a contact range of the workpiece and the rotor.

Accordingly, the rotor is rotated to come in close contact with the workpiece only by pressing the workpiece on to the rotor so that an accurate angle measurement can be performed in a short time.

A bend angle measuring method of the invention according to a second aspect in the bend angle measuring method of the first aspect is characterized in that the rotation angle of the rotor is obtained by reading a scale provided at an outer periphery of the rotor and from a difference between the division of the scale showing a predetermined rotation position of the rotor and a value of the scale when the another side of the workpiece is brought into close contact with the rotor.

Accordingly, the rotation angle of the rotor can be read by reading the division of the scale provided at an outer periphery of the rotor and from a difference between the division of the scale to a predetermined angle of the rotor and the division of the scale obtained when the rotor is caused to abut on the workpiece.

A bend angle measuring apparatus of the invention according to a third aspect comprises: a first supporting member for supporting one side of a workpiece which has been bent by a bending machine; a second supporting member provided at one side of the first supporting member in a standing manner; a rotor which is provided rotatably about a rotation center shaft provided on the second supporting member and which is caused to abut on another side of the workpiece; and a detector for reading the rotation angle of the rotor, wherein the first supporting member is provided such that the height position thereof is adjustable in order to set the relative height position of the rotation center shaft within a contact range of the rotor and the workpiece.

In the above-mentioned bend angle measuring apparatus, when a workpiece whose bend angle is to be measured is slid to be pressed on to the rotor in a state where the workpiece is caused to abut on the first supporting member serving as the first reference surface, the rotor is rotated about the rotation center shaft provided on the second supporting member, so that the bend angle of the workpiece can be measured by reading the rotation angle of the rotor by the detector. At this time, adjustment of the height position of the first supporting member to the rotation center of the rotor is performed so that the rotation center is positioned within the contact range of the workpiece and the rotor.

Accordingly, the rotor is rotated to come in close contact with the workpiece only by pressing the workpiece on to the rotor, so that an accurate angle measurement can be performed in a short time.

A bend angle measuring apparatus of the invention according to a fourth aspect in the bend angle measuring apparatus of the third aspect further comprises a projection for calibration which is provided at the rotor in a projecting manner; and a stopper which is provided at the second supporting member and on which the projection abuts when the rotor is rotated at a predetermined angle.

In the above-mentioned bend angle measuring apparatus, calibration is performed by rotating the rotor to cause the projection to abut on the stopper provided on the second supporting member prior to measurement of the bend angle.

Accordingly, the calibration can be performed easily and quickly.

In a bend angle measuring apparatus of the invention according to a fifth aspect in the bend angle measuring apparatus of the fourth aspect, the stopper has a taper portion or an eccentric portion for allowing adjustment of the position where the projection provided on the rotor is retained.

In the above-mentioned bend angle measuring apparatus, when the calibration is performed by rotating the rotor, the stopper provided on the second supporting member is adjusted and a position on which the projection of the rotor comprising the taper portion or the eccentric portion abuts is adjusted so that fine adjustment for the calibration is performed.

Accordingly, an accurate angle measurement can be performed.

A bend angle measuring apparatus of the invention according to a sixth aspect in the bend angle measuring apparatus of the third aspect is provided with a transmitter for transmitting the rotation angle of the rotor which has been read by the detector to the bending machine by radio.

In the above-mentioned bend angle measuring apparatus, the bend angle of the workpiece which has been measured by the bend angle measuring apparatus is transmitted to the bending machine by radio.

Accordingly, it becomes unnecessary to input the bending angle as data in the bending machine so that workability can be improved.

A bend angle measuring system of the invention according to seventh aspect comprises: a bending machine for bending a workpiece; a bend angle measuring apparatus for detecting the bend angle of the workpiece which has been bent by the bending machine; and a transmitter for transmitting the angle which has been measured by the bend angle measuring apparatus to the bending machine via radio or cable.

In the above-mentioned bend angle measuring system, the bend angle of the workpiece which has been bent by the bending machine is measured by the bend angle measuring apparatus, and the measurement signal is transmitted to the bending machine by the transmitter through radio or cable.

Accordingly, it becomes unnecessary to input the measured bend angle as data in the bending machine so that workability can be improved.

In a bend angle measuring system of the invention according to an eighth aspect in the bend angle measuring system of the seventh aspect, a spring back amount is obtained from a measurement signal after the spring back of the workpiece, which has been transmitted by the transmitter, and a bend angle before spring, which has been measured by an indicator provided on the bending machine; and the spring back amount is stored in a memory of a control device provided in the bending machine.

In the above-mentioned bend angle measuring system, the bend angle after spring back of the workpiece which has been bent is transmitted from the transmitter of the bend angle measuring apparatus to the control device of the bending machine, and the bend angle before spring back which has been measured by the indicator provided on the bending machine is taken in the control device of the bending machine so that the spring back amount is calculated and stored in the memory.

Accordingly, in a case that working conditions similar to the above are applied to bending works subsequent to this bending work, it becomes possible to perform a desired bending work accurately without performing a trial bending.

BEST MODE FOR CARRYING OUT THE INVENTION

Figure 1:
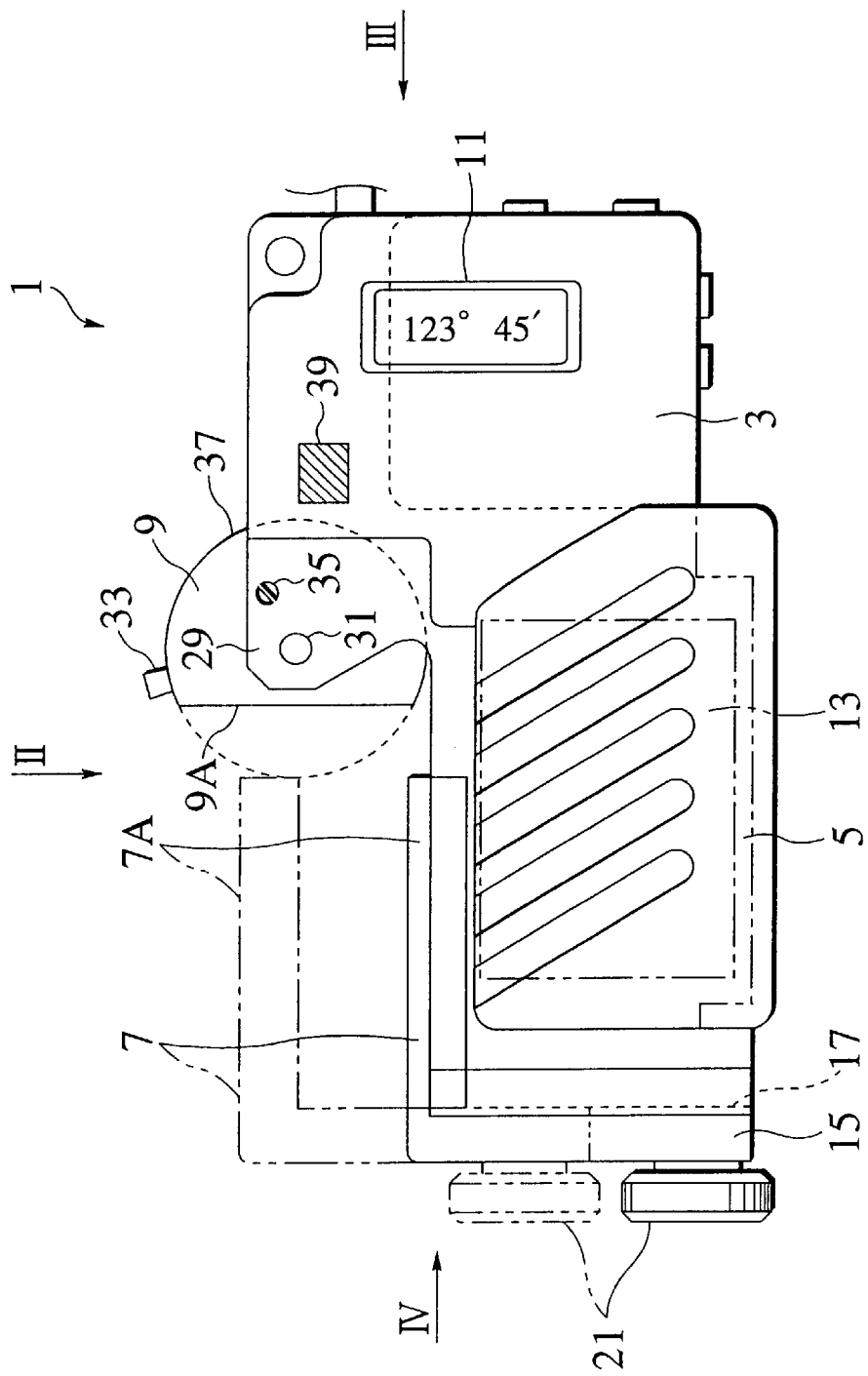
FIG. 1 is a front view showing a bend angle measuring apparatus according to the present invention.
Figure 2:
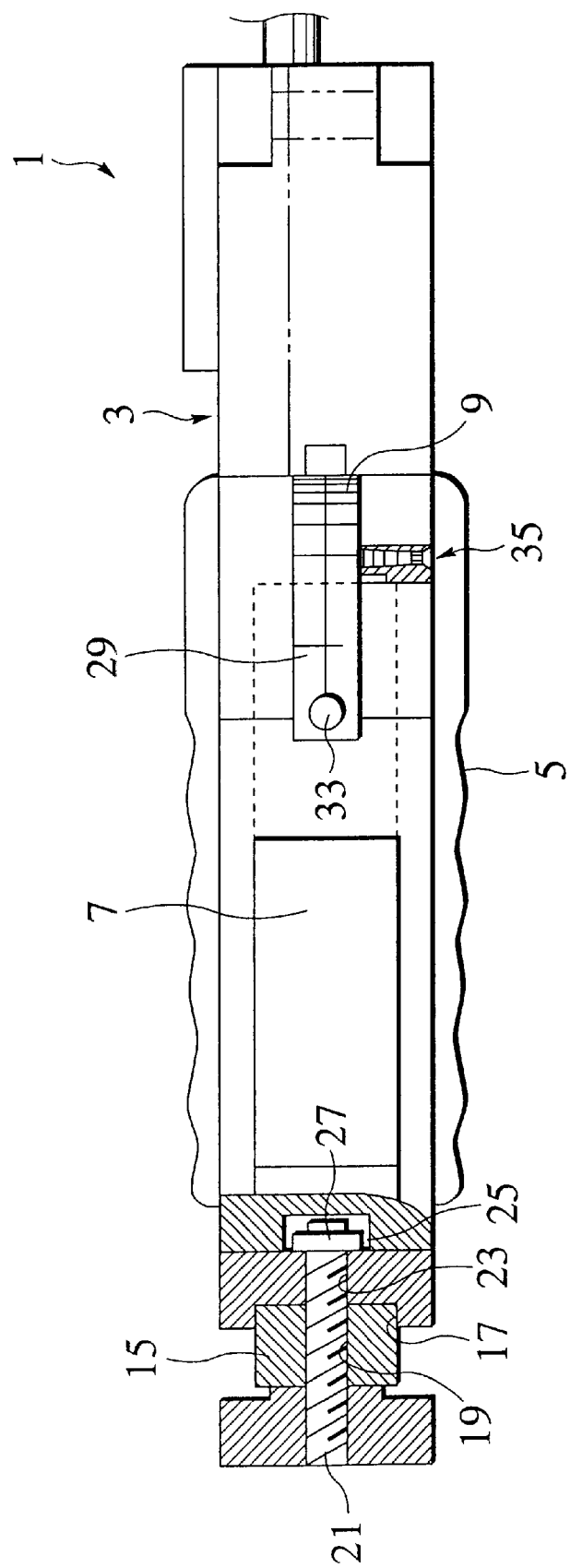
FIG. 2 is a plan view seen from arrow II direction in FIG. 1.
Figure 3:
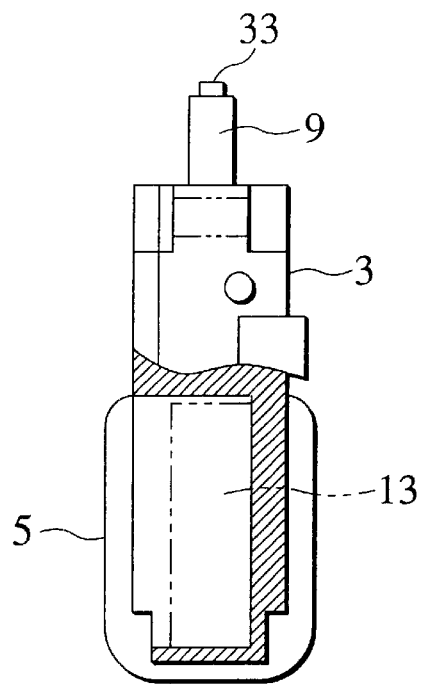
FIG. 3 is a side view seen from arrow III direction in FIG. 1.
Figure 4:
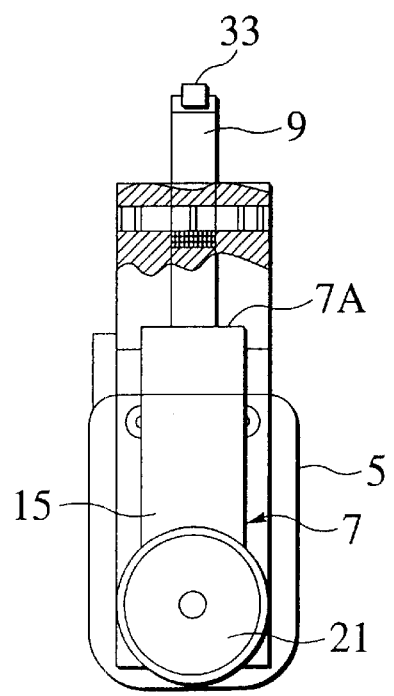
FIG. 4 is a side view seen from arrow IV direction in FIG. 1.

Embodiments of the present invention will be explained below with reference to the drawings.

A bend angle measuring apparatus 1 according to the present invention is shown in FIG. 1 to FIG. 4. The bend angle measuring apparatus 1 has a main body portion 3, a grip portion made of resin, a measurement reference member 7 with which one side of a workpiece W serving as a reference is brought into area contact and which serves as a first supporting member, a rotor 9 which rotates according to another side of the workpiece W which has been bent, a displaying section 11 for displaying the bend angle of the workpiece W from the rotation angle of the rotor 9, and the like. Also, accommodated inside the grip portion 5 is a battery 13.

The measurement reference member 7 is formed as a whole in a L-shape, where one side 15 is engaged with a vertically extending groove portion 17 provided on a left end face, in FIG. 1, of the main body portion 3 and the one end 15 can be fixed by a fixing bolt 21 via a through hole 19 formed in the one side 15. That is, a cut-out 23 extending vertically is provided in the groove portion 17 and a space 25 wider than the cut-out 23 is provided inside the cut-out 23. A retaining plate 27 provided on an distal end of the fixing bolt 21 in a threading manner can be moved upward and downward, and the measurement reference member 7 is fixed at a desired position in by fastening the fixing bolt 21 in cooperation with the retaining plate 27.

Accordingly, the measurement reference member 7 is made movable upward and downward along the groove portion 17 of the main body portion 3 by loosening the fixing bolt 21, and it can be fixed by fastening the fixing bolt 21 so that a relative height position of a reference face 7A of the measurement reference member 7 is made adjustable.

A projecting portion 29 which is a second supporting member is provided so as to project from the main body portion 3 leftward and upward in FIG. 1, and the rotor 9 is a portion of a circle centering a rotation center shaft 31 provided on the projecting portion 29 and has a flat measurement face 9A. The rotor 9 is rotatable about the rotation center shaft 31, and it is rotated by bringing the measurement face 9A into contact with another side of the workpiece W which has been bent up, so that the rotation angle of the rotor 9 is displayed on the displaying section 11.

Figure 5:
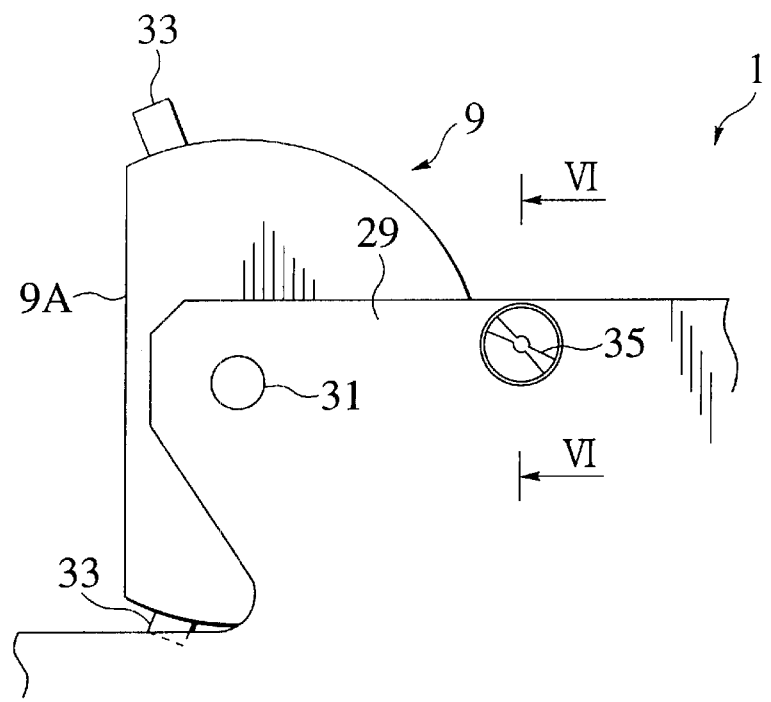
FIG. 5 is an enlarged view of a rotor mounting portion.
Figure 6:
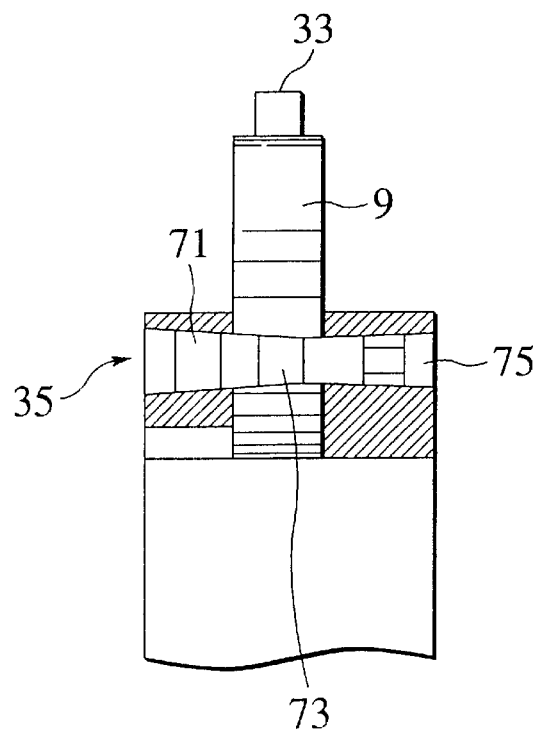
FIG. 6 is a sectional view taken along line VI—VI in FIG. 5.
Figure 7:
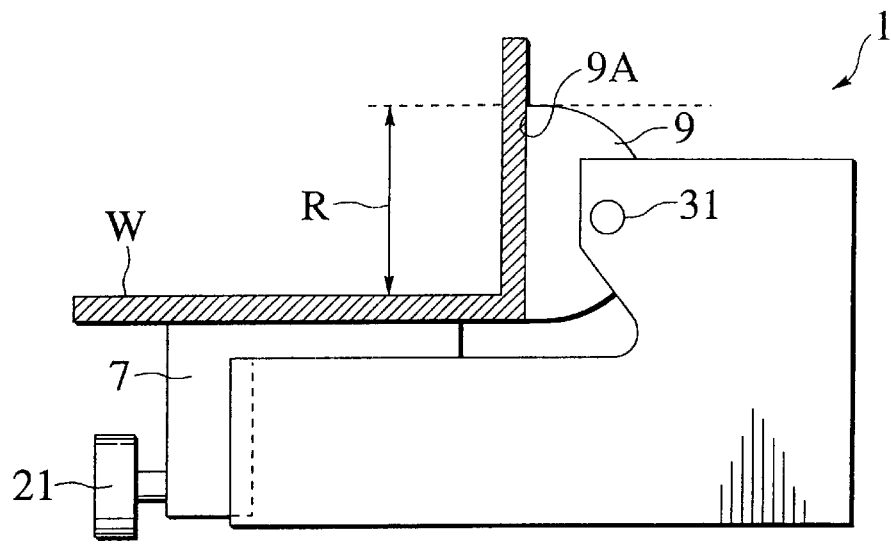
FIG. 7 is a front view showing a state of positioning a measuring reference member.
Figure 8:
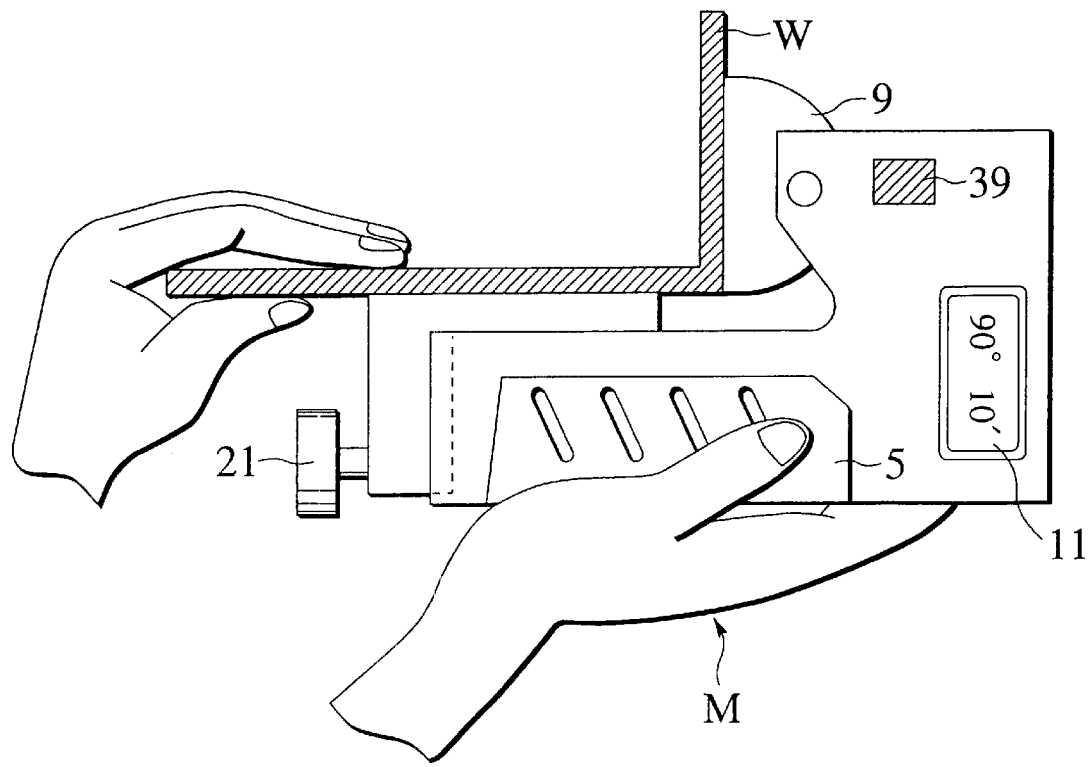
FIG. 8 is an explanatory view showing a state where a worker is measuring a bend angle.

Referring to FIG. 5 as well as FIG. 6, stopper pins 33 are respectively provided on both ends of an outer peripheral surface of an arc portion of the rotor 9. On one hand, a stopper 35 is provided on the main body portion 3, and when the rotor 9 is rotated at a constant angle, the stopper pin abuts on the stopper 35, thereby preventing further rotation of the rotor 9. Also, a detector 39 for reading the division of a magnetic scale 37 which serves as a scale and which is provided on an outer periphery of the rotor 9 is provided inside the main body portion 3 rearward of the rotor 9 (the right direction in FIG. 1).

Bend angle measurement operation of the workpiece W will be explained with reference to FIG. 7, FIG. 8, and FIGS. 9A to 9C.

Figure 10:
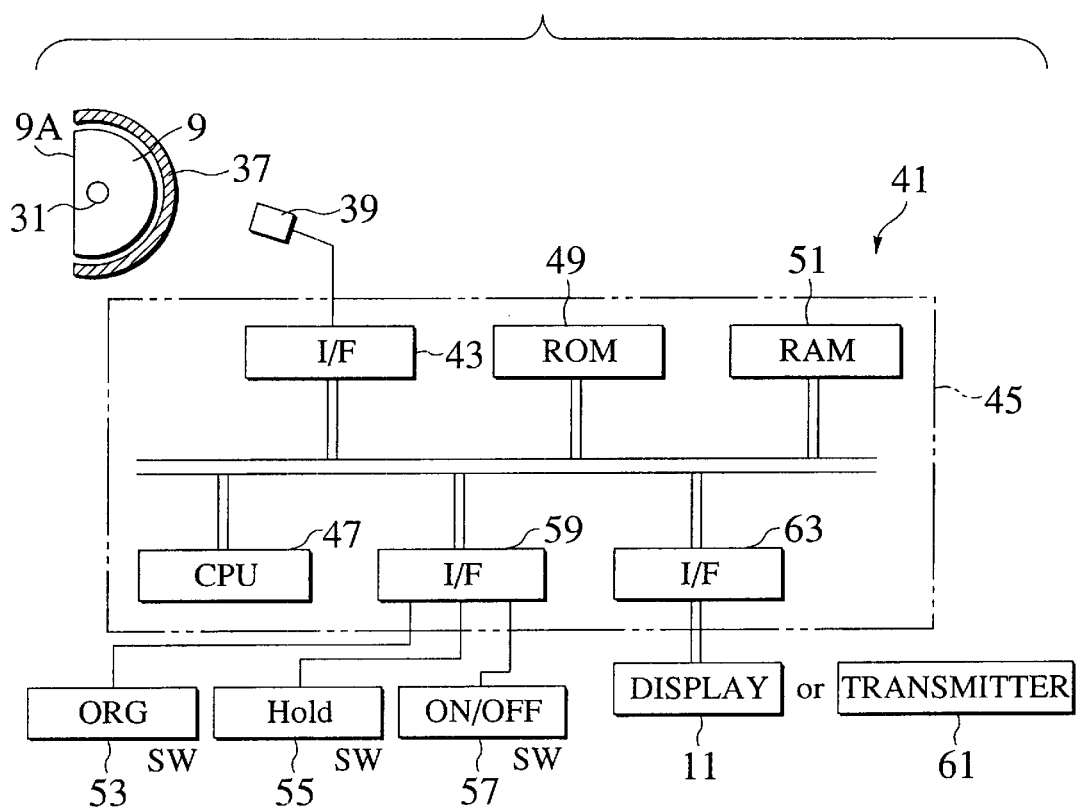
FIG. 10 is a block configuration diagram showing a calibration device.

With reference to FIG. 10, calibration (origin setting) of the rotor 9 is performed by a calibration device 41 housed in the main body portion 3 prior to measurement. The calibration device 41 is provided with the detector 39 for reading the division of the magnetic scale 37 provided along the outer periphery of the rotor 9, and a signal from the detector 39 is input into a reading control section 45 via an interface 43.

The reading control section 45 has a CPU 47 which is a central processing unit, and a ROM 49 and a RAM 51 which are storage devices. Also, the reading control section 45 has an interface 59 connected with an origin switch 53, a hold switch 55, an ON/OFF switch, and the like, and an interface 63 for displaying an angle on the displaying device 11 or sending a signal by a transmitter 61.

In a calibration process, the ON/OFF switch 57 is turned on, and a square (not shown) which is a jig showing 90° accurately is pressed on the rotor 9. The origin switch 53 is turned on, and the division of the magnetic scale 37 of the rotor 9 is read by the detector 39 to be stored in the RAM 51. Thereby, a position where the rotor 9 indicates 90° accurately is registered.

Figure 11:
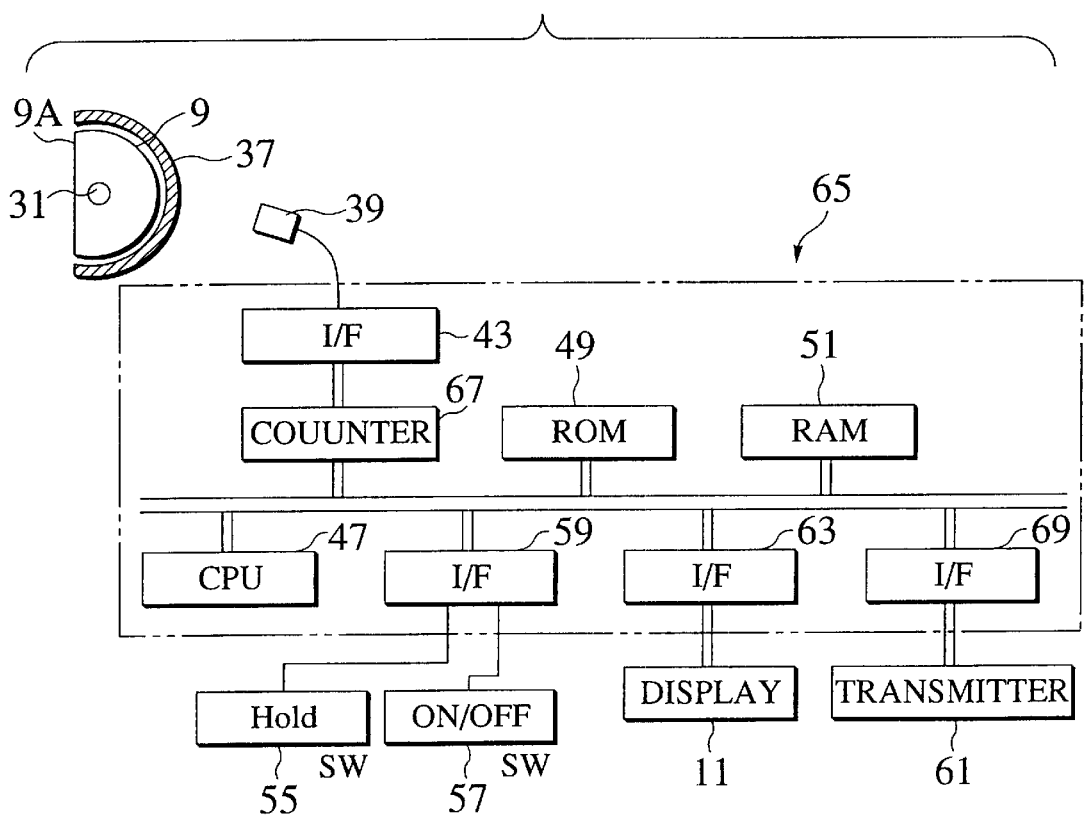
FIG. 11 is a block configuration diagram showing another calibration device.

Alternatively, another calibration process will be explained with reference to FIG. 11. A calibration device 65 for this case is provided with the detector 39 for reading the division of the magnetic scale 37 provided along the outer periphery of the rotor 9, and a signal from the detector 39 is input into a counter 67 of the reading control section 45 via the interface 43. In this case, the transmitter 61 is also provided in addition to the displaying device 11, and an interface 69 for the transmitter 61 is provided. Since the other configuration is similar to the above-mentioned case shown in FIG. 10, same portions are attached with same reference numerals and repeated explanations will be omitted.

Using such a calibration device 41, the rotor 9 is rotated such that the stopper pin 33 provided on the rotor 9 abuts on the stopper 35 provided on the main body portion 3. In this state, when the ON/OFF switch 57 is turned on, the counter 67 is automatically cleared to zero, so that the angle at this time is stored as 180° in the RAM 51. The square (not shown) of 90° is pressed on the rotor 9 and the division of the magnetic scale 37 of the rotor 9 is read by the detector 39 so that whether or not 90° is displayed on the displaying device 11 is confirmed.

In a case that the display on the displaying device 11 is not 90°, adjustment of the origin is performed by the stopper 35. That is, referring to FIG. 6, the stopper 35 has an adjustment screw portion 71, a taper portion 73, and a fixing screw 75, and because the stopper 35 moves in a leftward direction and a rightward direction by rotating the adjustment screw portion 71, the contacting position of the rotor 9 with the stopper pin 33 is changed. Also, the stopper 35 may comprises an eccentric shaft. Thereby, since the position of the origin is adjusted, whether or not display is 90° is confirmed by pressing the square of 90° on the rotor 9 again. This work is repeated until the display becomes 90° and, after the adjustment has been completed, the stopper 35 is fixed by fastening the fixing screw 75.

When the calibration is completed in this manner, measurement of the bend angle of the workpiece W is performed in the following manner when the measurement starts, first, for allowing proper measurement of the bend angle of the workpiece W, the fixing bolt 21 is loosened and the measurement reference member 7 is adjusted in an upward or downward direction such that the rotation center shaft 31 enters in the contacting region R (refer to FIG. 7) of the workpiece W.

Namely, in a case that the rotation center shaft 31 of the rotor 9 is not in the contacting area R of the workpiece W, the rotor 9 does not rotate following the workpiece W, even when the workpiece W is pressed on to the rotor 9, so that the measurement face 9A of the rotor 9 does not come in close contact with the workpiece W. For this reason, a case that accurate angle measurement can not be performed occurs.

Figure 9A:
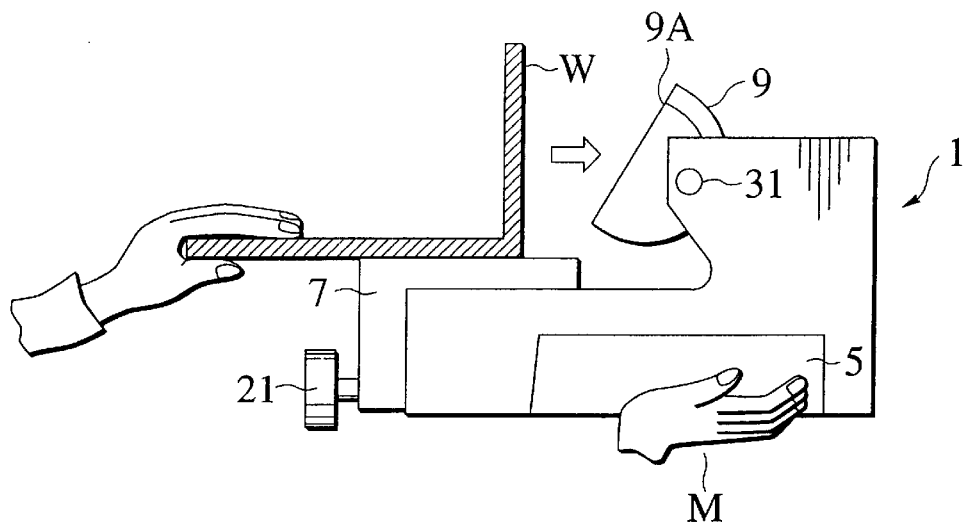
FIGS. 9A to 9C are explanatory views showing respective steps of a bend angle measuring method.
Figure 9B:
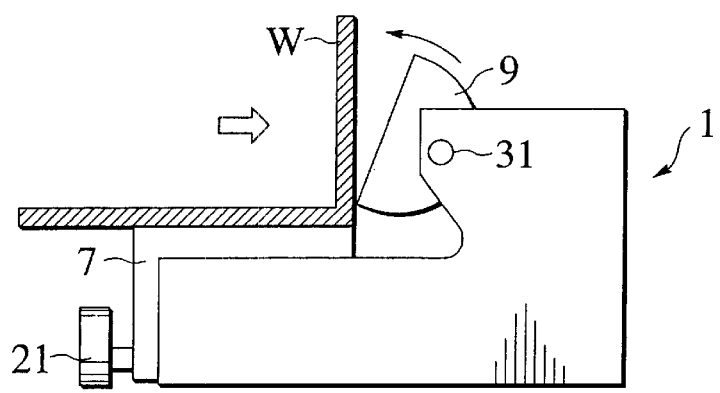
Figure 9C:
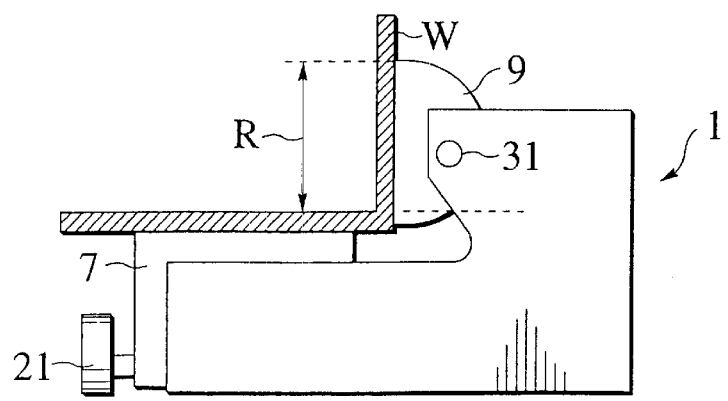

When the angle measurement is performed, a worker M holds the grip portion 5 of the bend angle measuring apparatus 1 in his/her one hand while he/she holds the workpiece W in his/her other hand (refer to FIG. 8 and FIG. 9A), he/she presses the workpiece W on to the rotor 9 (refer to FIG. 9B). Thereby, since the rotor 9 is rotated and the workpiece W comes in close contact with the measuring face 9A of the rotor 9 (refer to FIG. 9C), the division of the magnetic scale 37 of the rotor 9 is read by the detector 39 and the angle of the bend is obtained from a difference between the read division and the division obtained in the case of 90° which has been registered in the calibration so that the angle is displayed on the displaying device 11. Alternatively, a measurement signal is transmitted by the transmitter 61.

Figure 12:
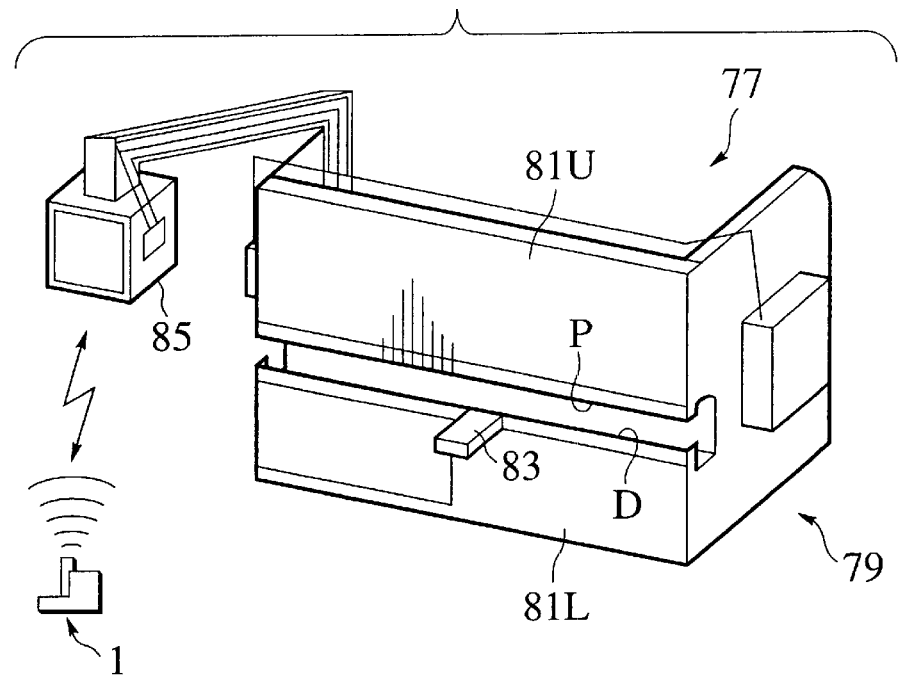
FIG. 12 is a general view showing an angle measuring system according to the present invention.
Figure 13:
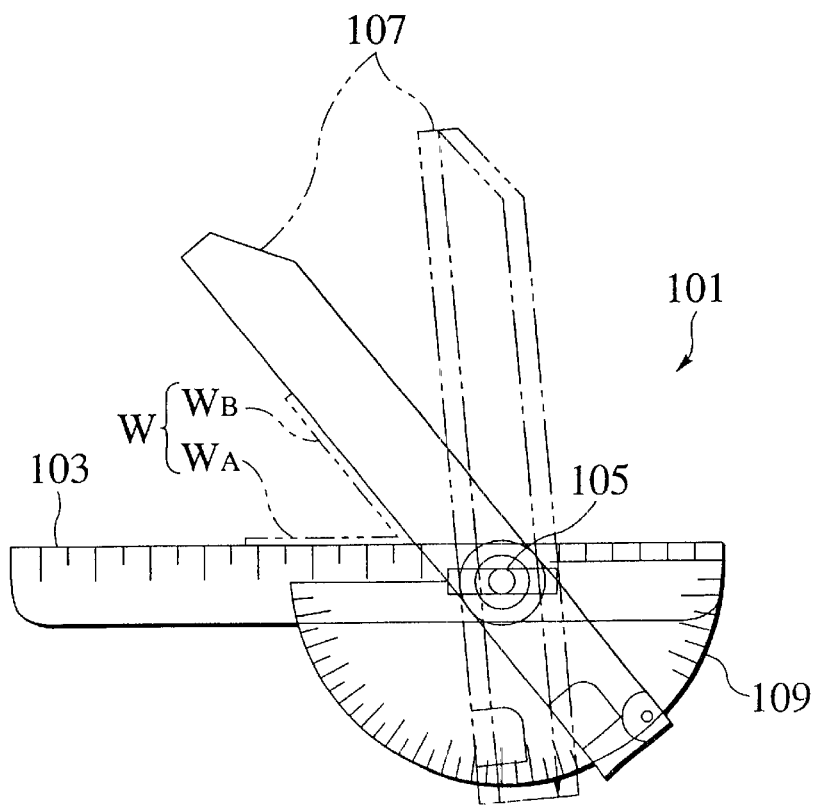
FIG. 13 is a front view showing a conventional bend angle measuring apparatus.

Next, a bend angle measuring system 77 using the above-mentioned bend angle measuring method and bend angle measuring apparatus 1 will be explained with reference to FIG. 12. In the bend angle measuring system 77, one of upper and lower tables 81U, 81L of a bending machine 70 (here, the lower table 81L) is provided with an indicator 83, and when a ram (not shown) is stroked by a predetermined distance after the bending of the workpiece W starts, measurement of the bend angle (clipping angle) is performed in a state where the workpiece W is clamped between a punch P and a die D.

Thereafter, the workpiece W is taken out and its bend angle after spring back is measured by the above-mentioned bend angle measuring apparatus 1. The angle measured by the bend angle measuring apparatus 1 is input directly into a NC machine 85 from the transmitter 61 provided on the bend angle measuring apparatus 1. In the NC machine 85, since a spring back amount is obtained from a difference between the above-mentioned clipping angle and the bend angle after the spring back, it is stored in a data base of a memory (not shown) of the NC machine 85.

In the subsequent bending works, when the working conditions similar to those of the above-mentioned bending work are applied, it becomes possible to determine D value which is a ram stroke without performing trial bending, taking into consideration the spring back amount which has been stored in the data base. Therefore, it is made possible to reduce the working time.

From the above results, since the rotation center of the rotor 9 is always positioned in the contacting region R of the rotor 9 and the workpiece W by adjusting the height position of the measurement reference member 7 irrespective of the size of the workpiece W, the rotor 9 follows the workpiece W to come in close contact with the same, so that angle measurement can be performed with a high accuracy in a short time.

Also, since a worker holds the grip portion 5 of the bend angle measuring apparatus 1 in his/her one hand, while he/she holds a workpiece W in his/her other hand, and the workpiece and the rotor 9 can be brought into close contact with each other easily only by pressing the workpiece W on to the rotor 9, workability can be improved.

Incidentally, the present invention is not limited to the above embodiments, and it can be implemented with other aspects through proper modifications.

What is claimed is:

1. A bend angle measuring method, comprising:
    causing one side of a workpiece which has been bent by a bending machine to abut a first supporting member serving as a reference surface;
    sliding the workpiece in a state where the one side of the workpiece has been caused to abut the first supporting member;
    pressing another bent side of the workpiece on to a rotatable rotor to come in close contact with the rotor;
    adjusting a height position of the first supporting member relative to the rotation center of the rotor;
    setting the rotation center within a contact range of the rotor and the workpiece; and
    reading the rotation angle of the rotor to obtain a bend angle of the workpiece in a state of the above step.

2. A bend angle measuring method according to claim 1, wherein
    the rotation angle of the rotor is obtained by reading a scale provided at an outer periphery of the rotor and from a difference between the division of the scale showing a predetermined rotation position of the rotor and a value of the scale when the another side of the workpiece is brought into close contact with the rotor.

3. A bend angle measuring apparatus, comprising:
    a first supporting member for supporting one side of a workpiece which has been bent by a bending machine;
    a second supporting member provided at one side of the first supporting member in a standing manner;
    a rotor which is provided rotatably about a rotation center shaft provided on the second supporting member and which is caused to abut on another side of the workpiece; and
    a detector for reading the rotation angle of the rotor,
    wherein the first supporting member is provided such that the height position thereof is adjustable in order to set the relative height position of the rotation center shaft within a contact range of the rotor and the workpiece.

4. A bend angle measuring apparatus according to claim 3, further comprising:
    a projection for calibration which is provided at the rotor in a projecting manner; and
    a stopper which is provided at the second supporting member and on which the projection abuts when the rotor is rotated at a predetermined angle.

5. A bend angle measuring apparatus according to claim 4, wherein
    the stopper has a taper portion or an eccentric portion for allowing adjustment of the position where the projection provided on the rotor is retained.

6. A bend angle measuring apparatus according to claim 3, wherein
    a transmitter for transmitting the rotation angle of the rotor which has been read by the detector to the bending machine via radio, is provided.

7. A bend angle measuring system, comprising:
    a bending machine for bending a workpiece;
    a bend angle measuring apparatus for detecting the bend angle of the workpiece which has been bent by the bending machine, said bend angle measuring apparatus being separate from the bending machine so that said bend angle measuring apparatus detects the bend angle of the workpiece after the workpiece has been removed from the bending machine; and
    a transmitter for transmitting the angle which has been measured by the bend angle measuring apparatus to the bending machine via radio or cable.

8. A bend angle measuring system, comprising:
    a bending machine for bending a workpiece;
    a bend angle measuring apparatus for detecting the bend angle of the workpiece which has been bent by the bending machine; and
    a transmitter for transmitting the angle which has been measured by the bend angle measuring apparatus to the bending machine via radio or cable;
    wherein a spring back amount is obtained from a measurement signal after the spring back of the workpiece, which has been transmitted by the transmitter, and a bend angle before spring, which has been measured by an indicator provided on the bending machine; and the spring back amount is stored in a memory of a control device provided in the bending machine.

* * * * *